United States Patent

Condon, Jr. et al.

[11] 3,930,692
[45] Jan. 6, 1976

[54] COMBINED RADIAL AND THRUST BEARING

[75] Inventors: Charles Edward Condon, Jr., Harwinton; Charles Warrell Shattuck, Goshen, both of Conn.

[73] Assignee: The Torrington Company, Torrington, Conn.

[22] Filed: Jan. 20, 1975

[21] Appl. No.: 542,112

[52] U.S. Cl. .................................. 308/174
[51] Int. Cl.² ............................... F16C 19/04
[58] Field of Search .......... 308/173, 174, 177, 219, 308/212, 213, 216, 236

[56] References Cited
UNITED STATES PATENTS

| | | | |
|---|---|---|---|
| 3,157,980 | 11/1964 | Kelecom | 308/174 |
| 3,168,359 | 2/1965 | Murphy | 308/174 |
| 3,341,263 | 9/1967 | Pitner | 308/174 |
| 3,632,178 | 1/1972 | Pitner | 308/174 |

FOREIGN PATENTS OR APPLICATIONS

| | | | |
|---|---|---|---|
| 1,010,792 | 11/1965 | United Kingdom | 308/174 |

*Primary Examiner*—Philip Goodman
*Assistant Examiner*—Richard A. Bertsch
*Attorney, Agent, or Firm*—Frank S. Troidl

[57] ABSTRACT

An annular shoulder on the radial bearing is contacted by the thrust bearing raceway radially inwardly from the inside periphery of the thrust bearing cage. Either the thrust race or the annular shoulder on the radial bearing, or both, may have an integral axial extension with the thrust race and the radial bearing interlocking radially inwardly from the inner periphery of the thrust bearing cage.

The bearing is pressed in to the bore of the housing by pushing against the thrust race with the force against the thrust race being transmitted by way of the annular shoulder to the radial raceway. Thus, it is not necessary to push the bearing into the housing bore by pressing against the thrust rollers which often results in critical damage to the thrust race.

8 Claims, 7 Drawing Figures

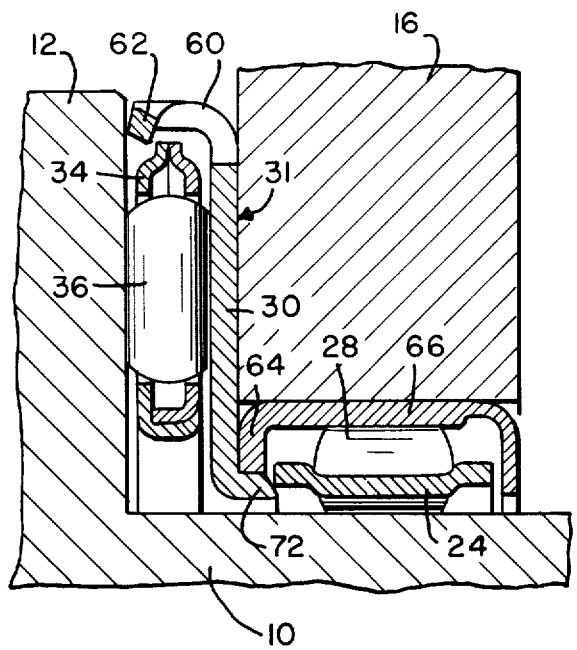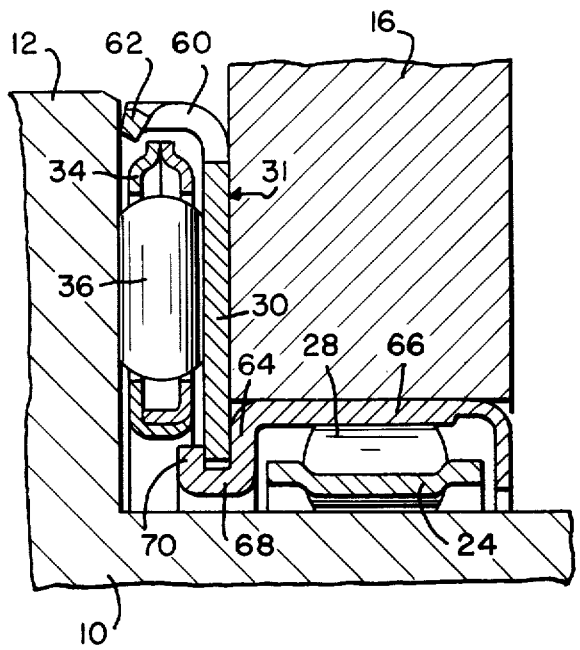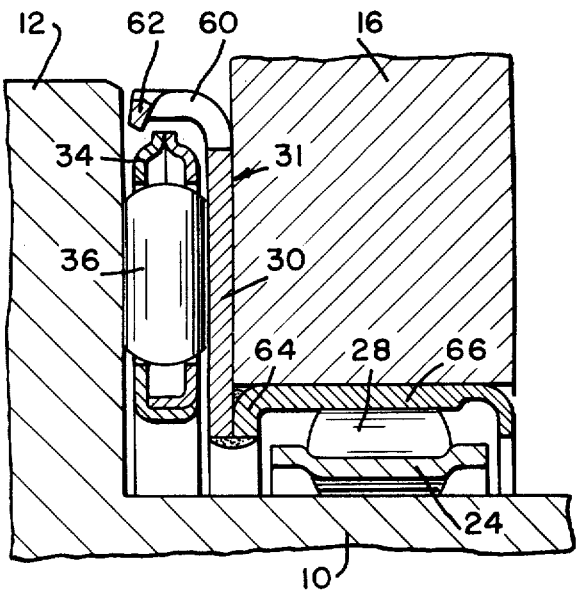

COMBINED RADIAL AND THRUST BEARING

This invention relates to combined radial and thrust bearings. More partiuclarly, this invention is a new and novel combined radial and thrust bearing which may be easily pushed into a housing bore without any critical damage to any part of the bearings such as the thrust race.

With currently known combined radial and thrust bearings, in installing these bearings in a mechanism, the radial bearing race is pushed into the housing bore by pressing against the thrust bearing rollers which in turn push against a thrust race which pushes against a thrust race back-up wall to push the radial bearing race into the housing. This installation force often results in permanent indentation of the thrust race by the thrust rollers. An example of such a currently used combined radial and thrust bearing is shown in U.S. Pat. No. 3,632,178 granted Jan. 4, 1972, to Alfred Pitner.

It is highly desirable to have a combined radial and thrust bearing which can be pushed into a housing bore without the possibility of any resulting permanent damage to any critical part of the bearing including the thrust race. It is also desirable in some cases to manufacture the two sections of the combined bearing race as separate pieces because the necessary dimensions of the combined bearing cause great difficulties in forming the combined race as one integral piece. In addition, sometimes it is desireable to have such a combined bearing which can be mounted to the housing as separate sections which interact as a single combined radial and thrust bearing after installation.

Briefly described our new combined radial and thrust bearing comprises a radial bearing race with an axially extending rolling member radial raceway with a substantially radially inwardly extending annular portion and a separate thrust bearing race with a radially extending thrust raceway with at least a portion thereof in assembled contact with the radially extending annular portion of the radial race. The combined bearing may be placed in the bore of the housing by pushing against the thrust race which in turn pushes against the annular portion. Thus, there is no pressure against the thrust rollers and, therefore, no indentation in the thrust race due to such pressure.

The invention as well as its many advantages may be further understood by reference to the following detailed description and drawings in which:

FIG. 5 is a sectional view showing another modification of our invention;

FIG. 6 is a sectional view of another modification of our invention; and

FIG. 7 is a sectional view of still another modification of our invention.

In describing the various figures, like parts are referred to by like numbers.

Figures 2, 3:
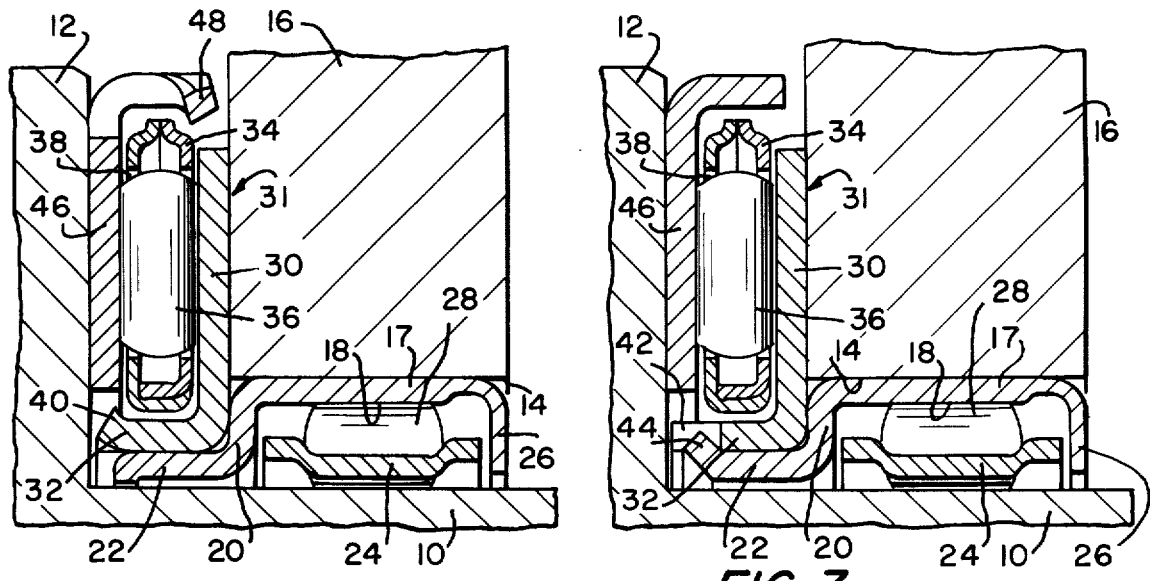
FIG. 2 is a sectional view taken along lines 2—2 of FIG. 1 and showing the bearing of FIG. 1 mounted on a rotatable shaft and in a housing bore.
FIG. 3 is a view similar to FIG. 2 and taken generally along lines 3—3 of FIG. 1.

Referring to the drawings, and more particularly to FIG. 2 and FIG. 3, our new combined radial and thrust bearing is shown in relation to a rotatable shaft 10 having a portion 12 of greater diameter. The combined bearing is shown mounted within a bore 14 of a housing 16, with the shaft mounted within the bore of the bearing.

The combined radial and thrust bearing has a radial bearing race 17 with an axially extending rolling member radial bearing raceway 18. A substantially radially extending annular shoulder 20 connects the radial bearing raceway to an axial extension 22. The extension 22 has a smaller outside diameter than the outside diameter of the radial bearing race 17.

A radial bearing cage 24 with rolling members 28 is positioned within the radial bearing race 17. The structure of the bearing cage and the way it is contained by the radial bearing race is not critical to this invention. It may be contained axially between the annular shoulder 20 and an opposite end flange 26, or it may be radially inward from the shoulder and end flange with the roller ends able to contact the race wall. In some bearing structures, the radial bearing cage is eliminated.

A thrust bearing race 31 with a radially extending thrust raceway 30 is provided at its inner end with an axially extending inner flange 32. Though the thrust race 31 and its inner flange 32 are made up of a separate member from the radial bearing race, it is in assembled contact with the radial bearing. This may be accomplished by press fitting the inner flange 32 of the thrust race 31 on to the outside of the axial extension 22 and into contact with the shoulder 20 of the radial bearing race 17. If desired, a permanent connection may be made by mechanical interlock or by welding or by adhesive bonding or other means for permanently attaching the separate thrust race to the radial race.

A thrust bearing cage 34 containing rolling members such as rollers 36 in the pockets 38 of the cage is axially contained by protrusions 40 extending outwardly from the axially extending flange 32 on thrust race 31. The thrust bearing cage 34 has axial running clearance but is prevented from excessive axial movement or escape by the protrusions 40. Of course, any other means for retaining the thrust bearing cage against excessive axial movement could be substituted for protrusions 40 such as a full rim on the free end of the flange 32 of the race 31 overlapping the cage 34.

Interlocking means are provided to interlock the thrust bearing race flange 32 and extension 22. A plurality of circumferentially spaced cutouts 42 (only one shown in FIG. 3 of the drawings) may be formed in the extremity of the flange 32. Also, a plurality of protrusions 44 may be formed on the extremity of the extension 22 on radial bearing race 17. Each projection 44 extends into a corresponding slot or cutout 42 holding the thrust race 32 assembled to the radial bearing race 17.

A second thrust race 46 is shown in the drawings. However, if desired, the second thrust race 46 may not be used, in which case the thrust rollers 36 will bear directly against the larger diameter portion 12 of the shaft 10 rather than against the second thrust race 46. If the second thrust race 46 is utilized, a plurality of circumferentially spaced tabs 48 may be formed on the outside flange of the thrust race 46 to hold that thrust race assembled to the cage 34.

Figure 1:
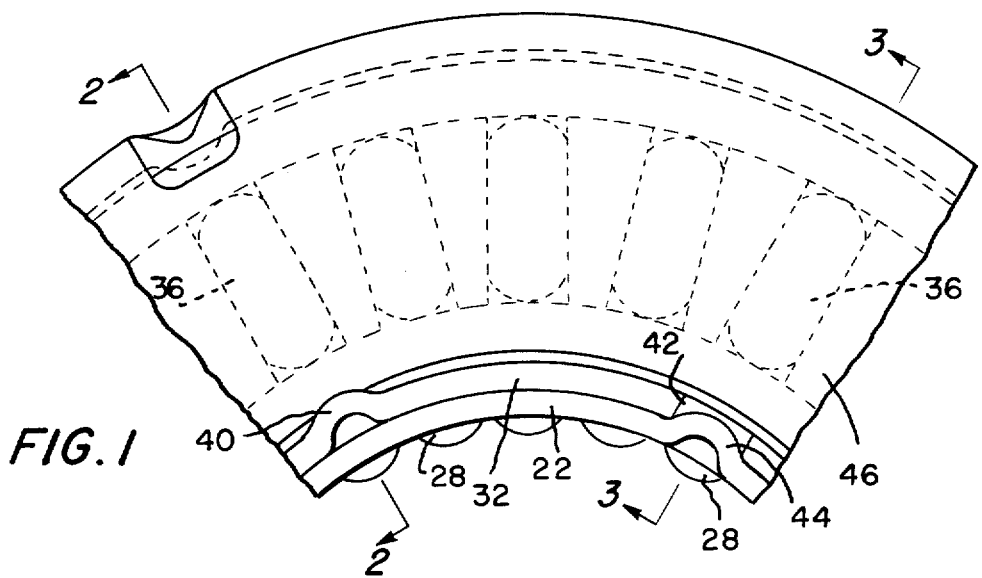
FIG. 1 is a partial front view of one preferred embodiment of our new combined radial and thrust bearing.
Figure 4:
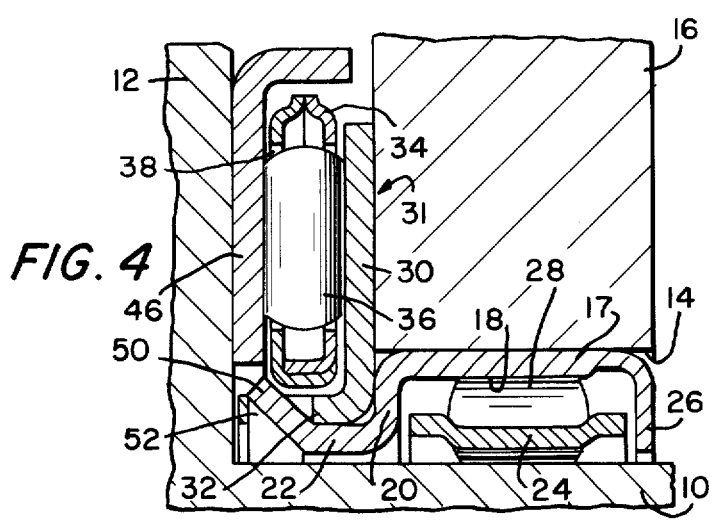
FIG. 4 is a view similar to FIG. 3 showing another modification of our invention.

In the embodiment shown in FIG. 4, the outwardly extending portion 50 serves the same function as both the projections 40 and projections 44 of the embodiment of FIGS. 1 through 3. The projections 50 of FIG. 4 are long enough to extend through the cutouts 52 in the flange 32 on thrust race 31 and to a point sufficiently far radially to be the by teh thrust bearing cage 34 if the cage 34 should start to move axially an excessive distance to prevent such excessive movement and possible escape of the cage from the race. Thus, the projections 50 serve the functions of helping to position the thrust race 31 on the radial bearing race 17 and also of maintaining the cage 34 against excessive axial movement. If desired, the flanges 32 in FIG. 3 and FIG. 4 may be short extending only to the base of the cutouts 42 or 52 as shown, and the projections 44 and 50 may be full annular projections to serve the same functions as individual separated projections.

To assemble to a housing, the unitary assembly of our combined radial and thrust bearing is placed in the bore 14 of the housing 16 by pressing against the inner flange 32 of the thrust race 31. This force is transmitted through the shoulder 20. The radial bearing race 17 is moved into the bore 14 until the thrust race 31 contacts the housing 16. This is done without any pressure directly against the rollers 36 or indirectly against the rollers 36 through a thrust race such as thrust race 46. Thus, there is no damage done to the thrust raceway 30 while the unitary radial and thrust bearing assembly is inserted into the housing 16. After the combined radial and thrust bearing is in proper position, the shaft 10 is introduced into the bearing and pushed in until the outer diameter portion 12 hits directly against the rollers 36 (if no thrust raceway 46 is included) or against the thrust raceway 46.

In the embodiments shown in FIG. 5, FIG. 6, and FIG. 7, the thrust bearing races do not have inner flanges. Instead, they have outer flanges 60 with radially inwardly turned projections 62 to hold the thrust bearing cage in the assembly. There could equally well be a second thrust race in each Figure. In FIG. 5, the flat raceway section of the thrust race 31 is bonded to the annular portion 64 of the radial bearing race 66. At assembly to the housing, force is applied to the inner area of the thrust race 31 opposite the shoulder.

In FIG. 6, the axial extension 68 from the annular portion 64 of the radial bearing race 66 is doubled back around the inside periphery of the flat thrust bearing raceway in a mechanical interlock. This interlock may be a full annular projection 70 or may consist of a plurality of individual projections from the axial extension. At assembly to the housing, axial force may be exerted against the locking projection which transmits the force to the raceway which transmits the force to the annular portion of the radial bearing race, or the primary installation force may be against the thrust raceway radially inward from the thrust bearing cage path.

In FIG. 7, the thrust race 30 has an inner flange 72 turned in the direction away from the thrust rollers and interlocking inside the inner periphery of the radially inwardly turned shoulder of the radial bearing race. At assembly to a housing, force is exerted against the thrust raceway radially inward of the thrust bearing cage and is transmitted to the annular shoulder through the flat raceway.

We claim:

1. A combined radial and thrust bearing comprising: an axially extending rolling member radial bearing race having an axially extending raceway and a substantially radially inwardly extending annular portion; a radially extending rolling member thrust bearing race, an axial extension integrally connected to the inner periphery of the thrust bearing race or the inner periphery of said annular portion, or both,; a thrust bearing cage with rolling members; said thrust bearing cage having a predetermined inner periphery; means for retaining the thrust bearing cage against excessive axial movement; and radial bearing rolling members, said thrust bearing race being separate from and having at least a portion thereof in interlocking contact with said radially inwardly extending portion radially inwardly of the inner periphery of the thrust bearing cage so that force may be applied against the radially inner portion of the radially extending thrust bearing race and against the annular portion of the radial bearing race to assemble the bearing in a housing.

2. A combined radial and thrust bearing in accordance with claim 1 wherein: said portion of the thrust bearing race is bonded to said substantially radially inwardly extending portion of the radial bearing race.

3. A combined radial and thrust bearing in accordance with claim 1 wherein: the substantially radially inwardly extending annular portion is an annular shoulder; the axial extension is integrally connected to the annular shoulder; and at least a part of the circumference of the axial extension is provided with a projecting surface doubled back around the inside periphery of the thrust race.

4. A combined radial and thrust bearing in accordance with claim 1 wherein: the axial extension is integrally connected to the thrust race and interlocks with the inner periphery of the substantially radially inwardly extending annular portion of the radial bearing race.

5. A combined radial and thrust bearing in accordance with claim 1 wherein: the substantially radially inwardly extending portion is an annular shoulder which connects the radial race to an axial extension having a smaller outside diameter than the outside diameter of said radial race; and the thrust bearing race has an inner axial flange with a portion of the radially extending thrust bearing race being in assembled contact with the annular shoulder of the radial race and the axial flange being in assembled contact with the outside of the radial race axial extension.

6. A combined radial and thrust bearing in accordance with claim 5 wherein: interlocking means are provided to interlock the thrust bearing race flange and the radial race extension.

7. A combined radial and thrust bearing in accordance with claim 6 wherein: the interlocking means comprises: a plurality of circumferentially spaced cutouts formed in the thrust bearing race flange; and a plurality of projections on the radial bearing race extension, each adapted to fit into a corresponding cutout.

8. A combined radial and thrust bearing in accordance with claim 7 wherein each projection on the axial extension of the radial bearing race is sufficiently long to extend through the cutout and retain the thrust bearing cage against excessive axial movement.

* * * * *